Sept. 5, 1939.   A. NAGEL   2,172,255
FILM SPOOL CASSETTE
Filed Oct. 14, 1936
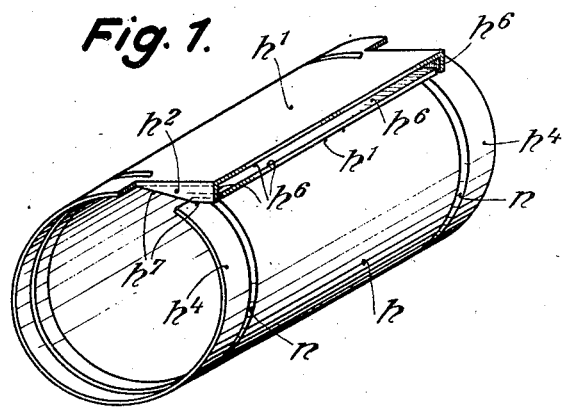
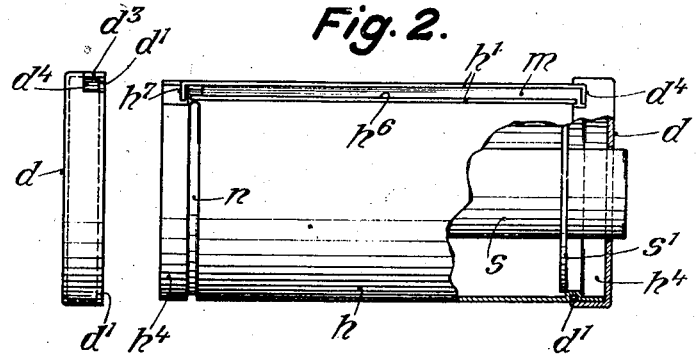
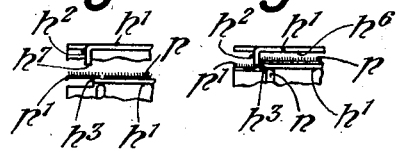
Inventor:
August Nagel
by Newton M. Perrins
George A. Gillette, Jr.
Attorneys Patented Sept. 5, 1939

2,172,255

UNITED STATES PATENT OFFICE 2,172,255

FILM SPOOL CASSETTE

August Nagel, Stuttgart, Germany, assignor to The Eastman Kodak Company, Rochester, N. Y., a corporation of New Jersey Application October 14, 1936, Serial No. 105,628
In Germany December 10, 1935

5 Claims. (Cl. 206—59)

The present invention relates to a film spool cassette which comprises a central collar-shaped sheath consisting in a strip of flexible material and a pair of covering caps fitting over the ends of said sheet and maintaining the same in the form of a cylinder.

More specifically, the invention relates to an improved connection between each covering cap and the sheath and constitutes an improvement over U. S. Patent No. 2,019,672. Said U. S. Patent No. 2,019,672 discloses interengaging connections between said covering caps and the sheath, which connections are held in engagement by the resiliency of said sheath and which are composed of pimples and holes in the respective members. The object of the present invention is the provision of a connection between the covering cap and sheath which connection comprises an annular groove and rim on the respective members and which groove and rim are also held in engagement by the resiliency of said sheath.

In order to close the sheath and hold the ends of the strip together, a covering cap may be pushed over each end of the sheath. Each covering cap may have a recess in its side wall which embraces the outlet slot formed by the ends of the flexible strip in such manner that the slot maintains the correct width for the withdrawal of the film. Preferably one or both of the inner surfaces of the walls of the outlet slot are covered with packing means, for example strips of fabric or the like, which singly or together project over the side edges of the slot in such manner that in cooperation with the perpendicularly bent edges of the longer end of the flexible strip and the recesses in the covering caps they form a light tight packing for the cassette.

The free end of the side wall of each covering cap is turned or flanged and fits into an annular groove in the flexible central sheath when the cassette is closed. By this means a light-tight closure of the ends of the cassette is obtained without the inconvenience of the hitherto necessary packing means or sealing tape. At the same time this arrangement makes it possible to remove the caps easily from the sheath when it is desired to open the cassette to insert or remove a film spool.

The invention is illustrated by the accompanying drawing in which:

Fig. 1 is a perspective view of the outwardly flexing central sheath of the cassette with the outlet slot through which the film is withdrawn.

Fig. 2 is a side view partly in section, of the cassette containing a spool and having one covering cap in position and the other removed.

Fig. 3 is a fragmentary view of one end of the outlet slot before closing, and

Fig. 4 is a fragmentary view of the same end of the outlet slot after closing with the covering cap.

The collar-shaped central sheath $h$ of the film spool cassette comprises a flexible strip of material bent into a cylinder, the ends of the strip remaining unjoined. The two unjoined ends $h'$ of the strip are made shorter than the cylinder forming the collar-shaped sheath $h$. The outer end $h'$ extends as a plane tangentially to the cylindrical part $h$, and is bent on each side to form a perpendicular lap $h^2$. The laps $h^2$ are in such a position relatively to the short edges $h^3$ of the inner end $h'$ of the flexible strip that the parts $h'$ and $h^2$ form a slot-shaped outlet passage $m$ when the inner and outer ends $h'$ of the strip are parallel (see Fig. 2).

On the inner surface $h^6$ of the inner end $h'$ of the flexible strip a piece of fabric packing $p$ is arranged of which the end $p'$ projects (as shown in Fig. 3) over the edges $h^3$ of the inner end $h'$. When the outlet slot $m$ is closed, as shown in Fig. 4, the end $p'$ of the fabric $p$ is pressed round over the edges $h^3$ of the inner end $h'$ and under the lower edges $h^7$ of the laps $h^2$ formed on the outer end $h'$ of the flexible strip.

In the side wall of the covering cap $d$ shown in Fig. 2 is a recess $d^3$ which, when the cap is pushed over the end $h^4$ of the collar-shaped central sheath $h$, embraces the slot $m$. The edge $d^4$ of the recess $d^3$ presses the still projecting end $p'$ of the fabric packing $p$ tightly against the outer surface of the lap $h^2$ whereby the cassette is light-tightly sealed.

In order to provide a secure covering which is yet capable of being opened the side wall of each covering cap $d$ is turned inwardly at its free edge distant from the base of the cap, or may be given an annular flange $d'$ which, when the cap is pressed over the flexible end $h^4$ of the central part $h$, enters the annular groove $n$ provided therein to give a good seal. If the inside edges of the slots $u$ project inwardly from the inner surface of the central sheath $h$, they can also serve as stops on which the flange $s'$ of the film spool $s$ contained in the cassette can bear.

I claim:

1. In a film cassette, the combination with a resilient sheath member provided with a longitudinal slot to form a film passage and which is formed so that the edges of said slot are normally separated, and a cap member having a side wall for overlapping said sheath member to maintain the same in a compressed position, of a light sealing connection between said sheath member and said covering cap member, comprising a groove in one of said members and a flange on the other of said members and maintained in engagement by the resiliency of said sheath member.

2. In a film cassette, the combination with a resilient sheath provided with a longitudinal slot to form a film passage, formed so that the edges of said slot are normally separated, and provided with a groove extending around said sheath, of a covering cap having a side wall for overlapping said sheath to maintain the same in a compressed position and having a flange on said side wall for fitting into said groove, the resiliency of said sheath maintaining said groove in engagement with said flange.

3. In a film cassette, the combination with a circular covering cap having a cylindrical side wall and inturned edge around said side wall, of a cylindrical sheath provided with a longitudinal slot, provided with an annular groove near one end of said sheath, and formed so that the edges of said slot are normally separated but maintained in compressed position by the side wall of said cap, the resiliency of said sheath also expanding said groove to engage said inturned edge.

4. In a film cassette, the combination with a circular covering cap having a cylindrical side wall and an inturned edge around said side wall, of a cylindrical sheath provided with a longitudinal slot provided with an annular groove near one end of said sheath, and formed so that the edges of said slot are normally separated but maintained in compressed position by the side wall of said cap, the resiliency of said sheath also expanding said groove to engage said inturned edge, and a flanged spool rotatably supported within said sheath and axially or laterally guided by the annular groove in said sheath.

5. In a film container, the combination with a sheath member provided from end to end with a longitudinal slot to form a film passage, and a cap member for enclosing one end of said sheath member, of a light sealing connection comprising an external peripheral groove in one of said members and an inturned flange on the other of said members, said inturned flange and said external peripheral groove being arranged to inter-engage with each other, when said cap member is fitted onto the end of said sheath member, to form a light-tight joint between said sheath and cap member.

AUGUST NAGEL.